US012228058B2

(12) United States Patent
Kono et al.

(10) Patent No.: US 12,228,058 B2
(45) Date of Patent: Feb. 18, 2025

(54) V-TYPE ENGINE, OUTBOARD MOTOR, AND SHIP

(71) Applicant: HONDA MOTOR CO., LTD., Tokyo (JP)

(72) Inventors: Shohei Kono, Wako (JP); Hirosuke Niwa, Wako (JP); Hayate Araki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/550,564

(22) PCT Filed: Mar. 19, 2021

(86) PCT No.: PCT/JP2021/011489
§ 371 (c)(1),
(2) Date: Sep. 14, 2023

(87) PCT Pub. No.: WO2022/195873
PCT Pub. Date: Sep. 22, 2022

(65) Prior Publication Data
US 2024/0151172 A1 May 9, 2024

(51) Int. Cl.
*F01N 3/04* (2006.01)
*F01N 3/20* (2006.01)
(Continued)

(52) U.S. Cl.
CPC ............... *F01N 3/046* (2013.01); *F01N 3/20* (2013.01); *F01N 3/2839* (2013.01); *F02B 67/00* (2013.01);
(Continued)

(58) Field of Classification Search
CPC .......... F01N 3/046; F01N 3/20; F01N 3/2839; F01N 2260/024; F01N 2590/021; F02B 67/00; F02B 75/22
See application file for complete search history.

(56) References Cited

U.S. PATENT DOCUMENTS 5,494,467 A * 2/1996 Sohgawa ............ B63H 20/245 440/89 R
6,662,555 B1 * 12/2003 Ishii ......................... F01N 3/28 60/299

(Continued)

FOREIGN PATENT DOCUMENTS

JP 6-159053 A 6/1994
JP 10-59290 A 3/1998

(Continued)

OTHER PUBLICATIONS

International Preliminary Report on Patentability dated Sep. 12, 2023, Application No. PCT/JP2021/011489; 7 pages.

(Continued)

*Primary Examiner* — Syed O Hasan
(74) *Attorney, Agent, or Firm* — Rankin, Hill & Clark LLP

(57) ABSTRACT

A V-type engine, an outboard motor, and a ship capable of restricting exposure of a catalyst to water. The engine includes cylinders where pistons operate are arranged in a V-shape, a crankshaft driven by driving of the pistons is disposed vertically, and exhaust pipes communicating with exhaust openings in the respective banks of a cylinder head and a catalyst holder that holds a catalyst in a merge portion where the exhaust pipes are merged in a site located on an upper side of the banks are included.

7 Claims, 8 Drawing Sheets

(51) Int. Cl.
*F01N 3/28* (2006.01)
*F02B 67/00* (2006.01)
*F02B 75/22* (2006.01)

(52) U.S. Cl.
CPC ........ *F02B 75/22* (2013.01); *F01N 2260/024* (2013.01); *F01N 2590/021* (2013.01)

(56) References Cited

U.S. PATENT DOCUMENTS

| | | | | |
|---|---|---|---|---|
| 7,954,314 | B1 * | 6/2011 | Bruestle | F01N 13/001 60/323 |
| 9,174,818 | B1 * | 11/2015 | Langenfeld | F01N 3/046 |
| 2014/0242859 | A1 * | 8/2014 | Ochiai | F01N 3/046 440/88 M |
| 2016/0341097 | A1 * | 11/2016 | Nose | F01N 3/10 |

FOREIGN PATENT DOCUMENTS

| | | | |
|---|---|---|---|
| JP | 2014-163288 | A | 9/2014 |
| JP | 2016-217217 | A | 12/2016 |
| WO | 2020/016615 | A1 | 1/2020 |

OTHER PUBLICATIONS

International Search Report from International Application No. PCT/JP2021/011489 dated Jun. 8, 2021, 2 pages.
Written Opinion of the International Searching Authority from International Application No. PCT/JP2021/011489 dated Jun. 8, 2021, 4 pages.

* cited by examiner

V-TYPE ENGINE, OUTBOARD MOTOR, AND SHIP

TECHNICAL FIELD

The present invention relates to a V-type engine, an outboard motor, and a ship.

BACKGROUND ART

Conventionally, purification of engine exhaust gas has been an important issue, but in general-purpose machines requiring compact engine periphery, it is difficult to install equipment for such purpose in a finite space, and thus, there have been a few such implementation examples. However, on the back of recent increasing environmental concerns, research on installation of exhaust purification equipment in general-purpose machines has actively been conducted. In such a V-type engine, an engine used in an outboard motor has conventionally been known in which a catalyst is provided inside exhaust pipes coupled to cylinders of the engine. In such an engine, the exhaust pipes are formed so as to arrange the catalyst on a lateral side of the cylinders (see, for example, Patent Literature 1).

CITATION LIST

Patent Literature

Patent Literature 1

International Publication No. WO 2020/16615

SUMMARY OF INVENTION

Technical Problem

However, in the configuration of prior art, since the catalyst is arranged at substantially the center in the up-down direction of the engine, the catalyst could be exposed to water.

The present invention has been made in view of the aforementioned circumstances, and provides a V-type engine, an outboard motor, and a ship capable of restricting exposure of a catalyst to water.

Solution to Problem

In order to achieve the aforementioned object, the present invention is a V-type engine in which cylinders where pistons operate are arranged in a V-shape and a crankshaft driven by driving of the pistons is disposed vertically, and which includes exhaust pipes communicating with the exhaust openings in the respective banks of a cylinder head and a catalyst holder that holds a catalyst in a merge portion where the exhaust pipes are merged in a site located on an upper side of the banks.

Advantageous Effects of Invention

According to the present invention, an advantageous effect of enabling to restrict exposure of a catalyst to water is produced.

DESCRIPTION OF EMBODIMENT

Hereinafter, an embodiment of the present invention will be described with reference to the drawings.

First Embodiment

Hereinafter, an embodiment of the present invention will be described with reference to the drawings.

First Embodiment

First, a V-type engine 10 used in an outboard motor of the present invention will be described with reference to FIG. 1 and FIG. 2.

Figure 1:
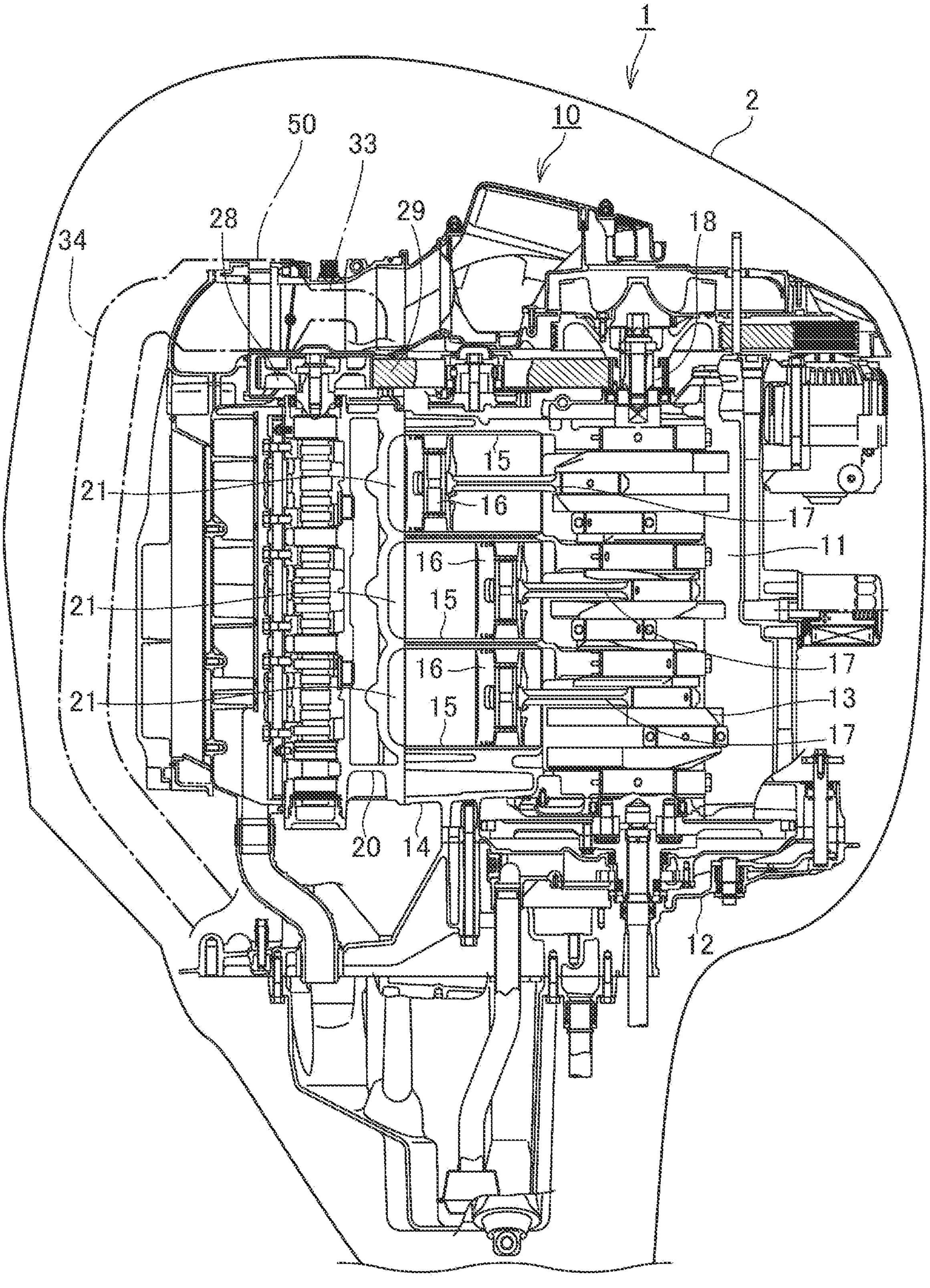
FIG. 1 is a longitudinal cross-sectional view illustrating an embodiment of an engine used in an outboard motor according to the present invention.

FIG. 1 is a longitudinal cross-sectional view illustrating an embodiment of the V-type engine 10. FIG. 2 is a lateral cross-sectional view of the V-type engine 10 of the present embodiment.

Figure 2:
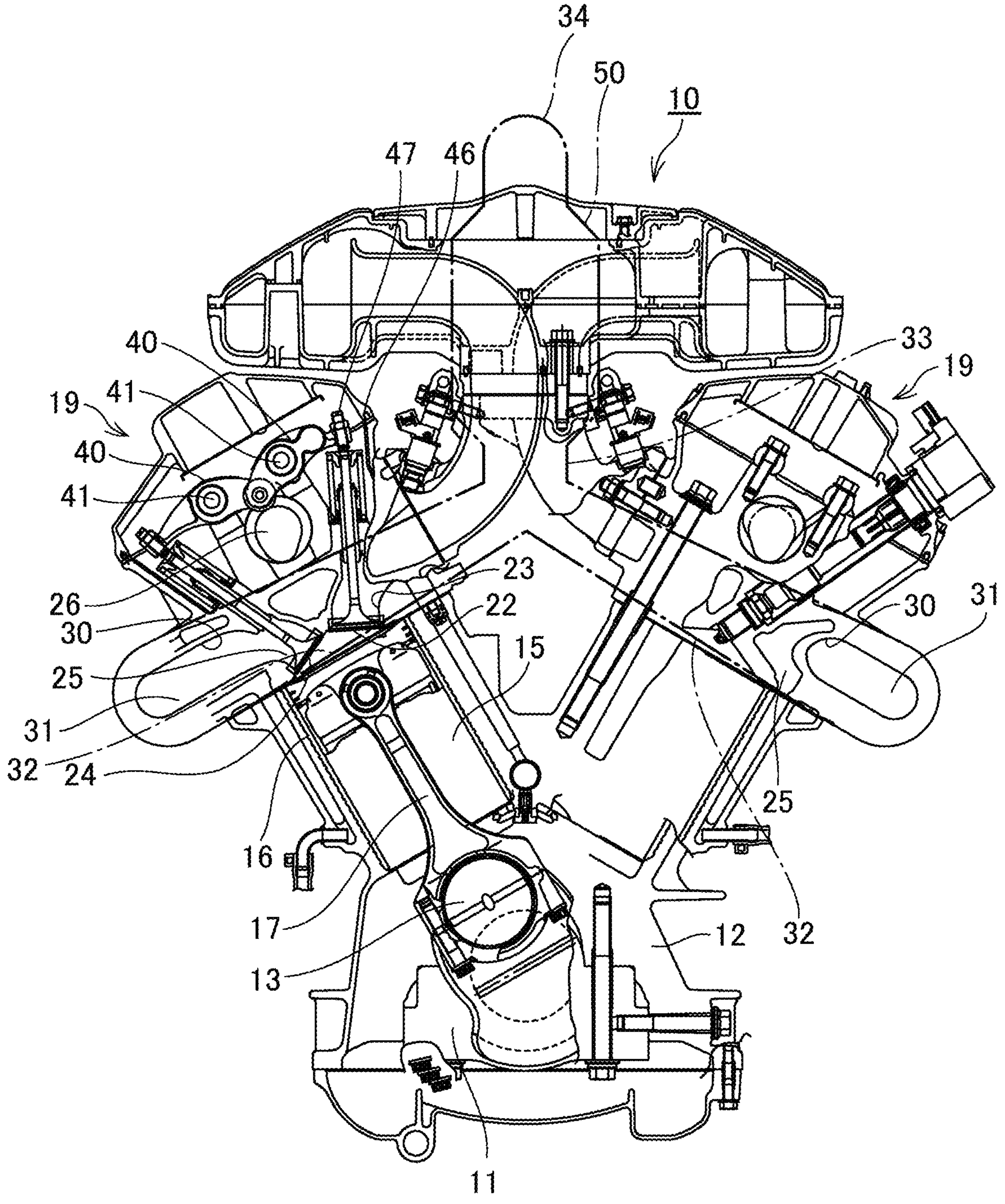
FIG. 2 is a lateral cross-sectional view of a V-type engine.

As illustrated in FIG. 1 and FIG. 2, the V-type engine 10 of an outboard motor 1 is a V-type six-cylinder, water-cooled, four-cycle engine with three cylinders 15 arranged in a V-shape.

The V-type engine 10 includes a crankcase 12 that forms a crank chamber 11. A crankshaft 13 is rotatably supported in the crankcase 12.

In each cylinder 15 of a cylinder block 14, a piston 16 is housed reciprocatably and each piston 16 is coupled to the crankshaft 13 via a connecting rod 17.

The V-type engine 10 is housed in a casing 2 of the outboard motor 1. The crankshaft 13 is configured so as to be coupled to a screw via a driving power transmission mechanism (not shown), so that the screw can be rotationally driven by the rotation of the crankshaft 13.

In a case where the outboard motor 1 is attached to a ship, the V-type engine 10 is disposed above the water surface.

A cylinder head 20 is provided, for each cylinder 15, with a combustion chamber 21 formed facing the piston 16, an intake port 23 that opens in the combustion chamber 21 and that is opened and closed by a pair of intake valves 22, and an exhaust port 25 that is opened and closed by a pair of exhaust valves 24.

The intake valves 22 and the exhaust valves 24 are driven to open and close by a cam 27 provided in a camshaft 26 that is rotatably pivotably supported in the cylinder head 20 and a rocker arm 40 that abuts on the cam 27.

The camshaft 26 is provided, in a right end portion, with a cam sprocket 28, and a timing belt 29 is stretched over between a drive sprocket 18 fitted near a right end portion of the crankshaft 13 and the cam sprocket 28.

In this manner, the intake valves 22 and the exhaust valves 24 are driven to open and close in synchronization with the rotation of the crankshaft 13.

Figure 3:
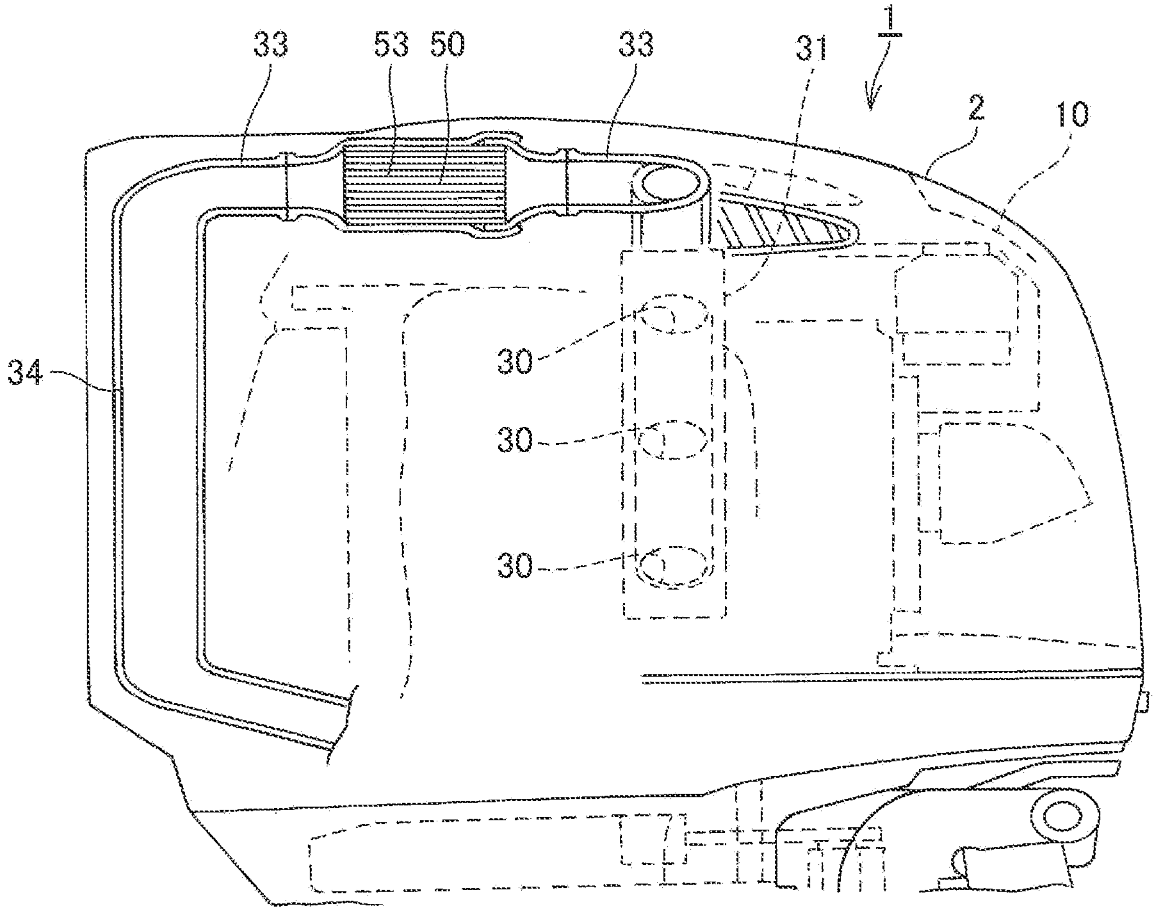
FIG. 3 is a side view illustrating a schematic configuration of an exhaust structure of the V-type engine.

FIG. 3 is a side view illustrating a schematic configuration of an exhaust structure of the V-type engine 10. Note that in FIG. 3, for convenience of explanation, a coupling exhaust pipe 32, a merging exhaust pipe 33, a catalyst holder 50, and a lower exhaust pipe 34 are depicted by solid lines.

As illustrated in FIG. 3, the V-type engine 10 is housed in the casing 2 of the outboard motor 1.

The V-type engine 10 includes upper exhaust pipes 31 each communicating with exhaust openings 30 of the three cylinders in two banks 19 in a V-shape. The upper exhaust pipes 31 are each arranged so as to extend in an up-down direction on an outer side of each bank 19 of the V-type engine 10.

An upper end portion of each upper exhaust pipe 31 extends toward the upper side of each bank 19. Further, one end of the coupling exhaust pipe 32 is connected to the upper end portion of each upper exhaust pipe 31. The coupling exhaust pipe 32 is a substantially straight tubular member and extends, on the upper side of each bank 19, from the upper end of each upper exhaust pipe 31. Further, each coupling exhaust pipe 32 extends in a direction leaving away from the crankcase 12, in other words, toward the intake port 23.

The other ends of the coupling exhaust pipes 32 are merged and connected with each other at the site located in substantially the middle of each bank 19.

One end of the merging exhaust pipe 33 that is a tubular member is connected to the site where these coupling exhaust pipes 32 are merged. The other end side of the merging exhaust pipe 33 extends in a direction leaving away from the crankcase 12, in other words, toward the intake port 23. Further, the merging exhaust pipe 33 passes substantially the middle of each bank 19 in a top view of the V-type engine 10.

The coupling exhaust pipes 32 in pair and the merging exhaust pipe 33 are arranged in a Y-shape in the top view of the V-type engine 10.

Note that without limiting to this, each coupling exhaust pipe 32 is a substantially straight tubular member and may be provided so as to extend over the upper end of each upper exhaust pipe 31 on the upper side of each bank 19. In this case, one end of the merging exhaust pipe 33 is connected to substantially the center in the longitudinal direction of the coupling exhaust pipe 32. Further, in this case, the coupling exhaust pipes 32 and the merging exhaust pipe 33 are arranged in a T-shape in the top view of the V-type engine 10.

The catalyst holder 50 is connected to substantially the center in a longitudinal direction of the merging exhaust pipe 33. The catalyst holder 50 is a substantially cuboidal member having a width greater than a diameter of the merging exhaust pipe 33.

On one end side of the catalyst holder 50, the site where the coupling exhaust pipes 32 and the merging exhaust pipe 33 are merged is located.

In the present embodiment, the catalyst holders 50 are fixed to an upper end portion of the cylinder head 20. In this manner, the outer side of the banks 19 of the V-type engine 10, that is, an unused space between the casing 2 and the banks 19 can be effectively used as an arrangement space for auxiliary equipment or a cable.

Note that without limiting to this, the catalyst holders 50 may be arranged on the upper side of each bank 19 of the V-type engine 10 or on an upper side of various intake system parts disposed between the banks 19. Further, for example, the catalyst holders 50 may be fixed to the various intake system parts. Further, the catalyst holder 50 may be provided in the merge site of the coupling exhaust pipes 32.

Figure 4:
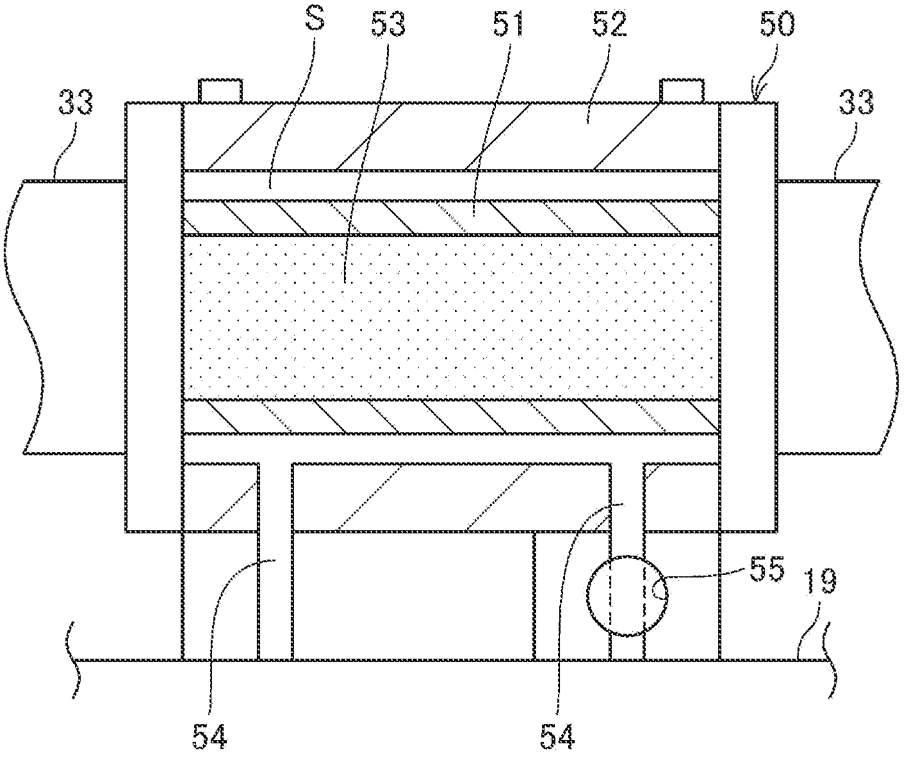
FIG. 4 is a longitudinal cross-sectional view illustrating a schematic configuration showing a catalyst holder.

FIG. 4 is a longitudinal cross-sectional view illustrating a schematic configuration of the catalyst holder 50 of the present embodiment. FIG. 4 illustrates a schematic configuration of a cross section along a longitudinal direction of the catalyst holder 50.

The catalyst holder 50 includes an inner tube 51 and an outer tube 52 disposed on an outer side of the inner tube 51.

A catalyst 53 is housed on an inner side of the inner tube 51. The catalyst 53 is a three-way catalyst that removes hazardous components in the exhaust gas, such as hydrocarbon (HC), carbon monoxide (CO), and nitrogen oxides (NOx), through oxidation and reduction reaction, and has, for example, a honeycomb catalyst structure in which a porous honeycomb structure body is coated with catalyst components, such as platinum, palladium, and rhodium. Note that the structure is not limited to the honeycomb catalyst structure, but may be of a simple type, such as a plate catalyst structure in which catalyst components are carried on a plate material.

The configuration is made such that part of cooling water to be delivered to the V-type engine 10 is guided between the inner tube 51 and the outer tube 52.

That is, a cooling water channel (not shown) is provided inside the cylinder head 20 of the V-type engine 10, and two pieces of cooling water piping 54 communicating with the cooling water channel are connected to the cylinder head 20.

Each piece of cooling water piping 54 communicates with a space S between the outer tube 52 and inner tube 51.

In the present embodiment, the V-type engine 10 is provided with a cooling water supply device (not shown) for delivering cooling water from a lower side of the V-type engine 10 to cool the V-type engine 10. The cooling water supply device is, for example, a pump or the like with a motor. When the V-type engine 10 is driven, the cooling water supply device is driven. The cooling water delivered by means of the cooling water supply device passes from the cylinder head 20 through one piece of the cooling water piping 54 to flow into the space S between the outer tube 52 and the inner tube 51 so as to cool the catalyst 53, and then returns to the cylinder head 20 through the other piece of the cooling water piping 54.

Figure 5:
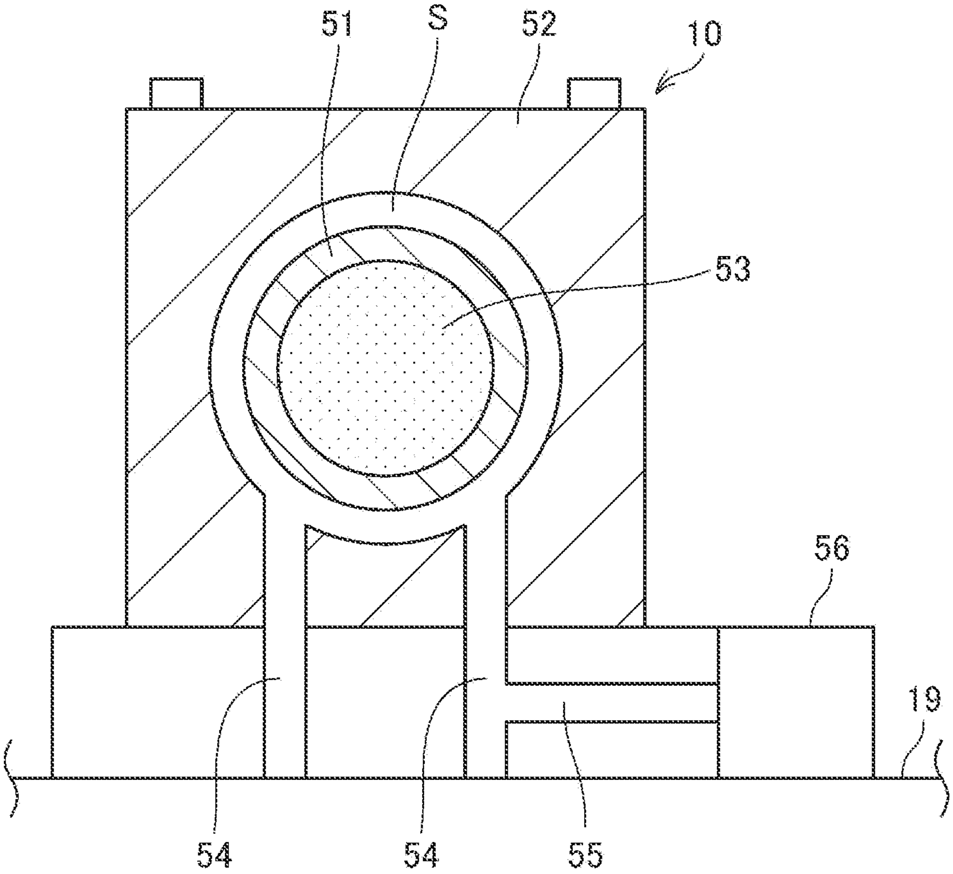
FIG. 5 is a lateral cross-sectional view illustrating the schematic configuration showing the catalyst holder.

FIG. 5 is a lateral cross-sectional view illustrating the schematic configuration of the catalyst holder 50 of the present embodiment. FIG. 5 illustrates the schematic configuration of a cross section along a direction orthogonal to the longitudinal direction of the catalyst holder 50.

As illustrated in FIG. 5, one end of secondary piping 55 is connected to one piece of the cooling water piping 54. The other end of the secondary piping 55 is provided with a water pump 56 that is the cooling water supply device for delivering cooling water. In the outboard motor 1, a cooling mechanism of the present invention is configured with the secondary piping 55 and the water pump 56.

As described above, in the V-type engine 10 of the present embodiment, the catalyst holder 50 is arranged on the upper side of each bank 19. Further, the cooling water supply device driven in accordance with driving of the V-type engine 10 delivers cooling water from the lower side of the V-type engine 10. Therefore, when the speed of the V-type engine 10 is not sufficiently increased, upon start-up of the V-type engine 10 or the like, the cooling water to be supplied to the catalyst holder by means of the cooling water supply device could be insufficient.

In the V-type engine 10 of the present embodiment, when the speed of the V-type engine 10 is not sufficiently increased, the water pump 56 is driven to deliver cooling water to the secondary piping 55 and one piece of the cooling water piping 54. In this manner, even when the speed of the V-type engine 10 is not sufficiently increased, the catalyst holder 50 can be cooled, that is, catalyst temperature adjustment can be performed.

Note that in the outboard motor 1, when the speed of the V-type engine 10 is sufficiently increased, the water pump 56 may be stopped.

An upper end of the lower exhaust pipe 34 is connected to the other end of the merging exhaust pipe 33. In the outboard motor 1, the exhaust pipe of the present invention is configured with the upper exhaust pipe 31, the coupling exhaust pipe 32, the merging exhaust pipe 33, and the lower exhaust pipe 34. Further, the merging exhaust pipe 33 and the coupling exhaust pipe 32 correspond to a merge portion of the exhaust pipes of the present invention.

The lower exhaust pipe 34 is a tubular member that is arranged on an outer side of the various intake system parts disposed between the banks 19 and that extends downward along the up-down direction of the V-type engine 10.

The other end of the lower exhaust pipe 34 communicates with an exhaust passage provided inside the casing 2. The exhaust passage communicates with water through a center portion of a screw (not shown).

Next, the function of the present embodiment will be described.

In the present embodiment, the V-type engine 10 is driven, thereby transmitting the driving force of the V-type engine 10 to a screw shaft (not shown) via the crankshaft 13 to thus rotate the screw so as to move a ship forward or backward.

Further, the hazardous components in the exhaust gas delivered to the upper exhaust pipe 31 are removed in the catalyst holder 50 by the catalyst 53, which sufficiently exhibits the catalytic efficiency, through oxidation and reduction reaction, and the exhaust gas is discharged into the water through a screw portion via the lower exhaust pipe 34.

In order to favorably perform oxidation and reduction reaction of the catalyst 53, the catalyst 53 needs to be maintained at a predetermined temperature. In the present embodiment, since cooling water is supplied between the inner tube 51 and the outer tube 52 of a catalyst holder 50 via the cooling water piping 54 so as to maintain the temperature of a catalyst holder 50 at a predetermined temperature, the temperature of the catalyst 53 can be adjusted to be a predetermined temperature.

Note that in the form of finished equipment, it is natural to select a cooling method, and for example, for a riding lawn mower or a riding snow blower, indirect cooling as in a passenger vehicle may be adopted, and for the outboard motor 1, a direct cooling method of directly taking in cooling water from water may be adopted.

In the present embodiment, the catalyst holder 50 is provided on the upper side of each bank 19 of the V-type engine 10. As described above, in a case where the outboard motor 1 is attached to a ship, the V-type engine 10 is disposed above the water surface. In this manner, the catalyst holder 50 is disposed in a position further higher than the water surface. Therefore, even when waves or the like occur, exposure of the catalyst holder 50 to the water for a long period of time is restricted, and in the V-type engine 10, a further higher effect of a waterproof measure in the catalyst holder 50 can be produced.

Further, the catalyst holder 50 is provided in the merging exhaust pipe 33 where the upper exhaust pipes 31 in the respective banks 19 are merged. In this manner, it is possible to collectively provide the catalyst 53 in one location. Thus, maintenance work such as inspection or replacement of the catalyst 53 is easy.

Moreover, in a case where the waterproof measure is not required as in a riding lawn mower, a riding snow blower, and the like, the exhaust openings 30 only need to be arranged on an engine mount directly from the catalyst holder 50 so as to communicate with the exhaust passage provided inside the casing 2.

Furthermore, when the lower exhaust pipe 34 on a downstream side of the catalyst holder 50 is arranged on the engine mount and communicates with the exhaust passage provided inside the casing 2, the layout of the exhaust system can be realized without waste.

As described above, in the present embodiment, the cylinders 15 where the pistons 16 operate are arranged in a V-shape and the crankshaft 13 driven by the driving of the pistons 16 is disposed vertically, and the upper exhaust pipes 31 (exhaust pipes) communicating with the exhaust openings 30 in the respective banks 19 of the cylinder head 20 and the catalyst holder 50 that is provided in the merging exhaust pipe 33 that merges the upper exhaust pipes 31 on the upper side of the banks 19 and that holds the catalyst 53 are included.

In this manner, the catalyst holder 50 is disposed at the highest position of the V-type engine 10 and in a position further higher than the water surface. Therefore, for example, in the outboard motor 1 including the V-type engine 10, even when waves or the like occur, the exposure of the catalyst holder 50 to the water is restricted, and a further higher effect of the waterproof measure in the catalyst holder 50 can be produced.

Further, in the present embodiment, the cooling water piping 54 where part of cooling water to be delivered to the cylinder head 20 is delivered is connected to the catalyst holder 50, and the cooling water piping 54 is provided with the water pump 56 that delivers cooling water to the catalyst holder 50.

In this manner, even when the speed of the V-type engine 10 is not sufficiently increased, the catalyst holder 50 can be cooled. Therefore, by maintaining the catalyst 53 at a predetermined temperature, oxidation and reduction reaction of the catalyst 53 can be favorably performed.

Note that in the aforementioned embodiment, the present invention has been described, but the present invention is not limited to the aforementioned embodiment, and change, substitution, addition, omission, and the like in various ways are available as needed.

Figure 6:
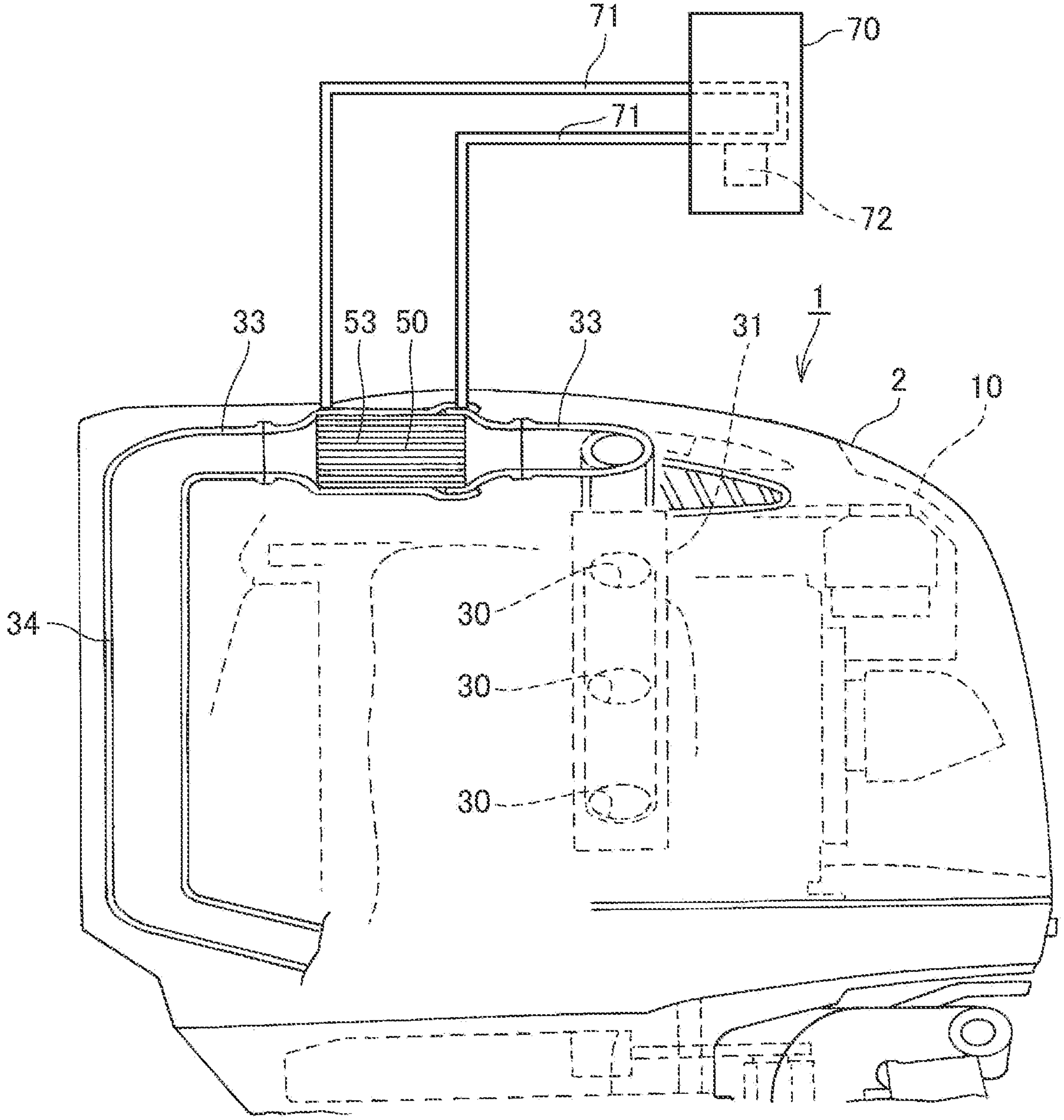
FIG. 6 is a side view illustrating a schematic configuration showing the exhaust structure of the V-type engine according to a modification.

FIG. 6 is a side view illustrating a schematic configuration showing the exhaust structure of the V-type engine 10 according to a modification.

For example, as illustrated in FIG. 6, each catalyst holder 50 may be provided with a radiator 70 that is an example of a cooling mechanism that cools and circulates the cooling water via pieces of external piping 71 in pair.

Specifically, the radiator 70 is a cooling unit composed of a cooling fan and a heat exchanger. The radiator 70 cools the cooling water flown into the heat exchanger by means of the cooling fan. The radiator 70 may be attached to an outer side of the casing 2 of the outboard motor 1. Further, without limiting to this, the radiator 70 may be attached to a ship to which the outboard motor 1 is attached.

The radiator 70 is provided with an external pump 72. The external pump 72, which corresponds to an example of the cooling water supply device, circulates the cooling water between the catalyst holder 50 and the radiator 70.

The cooling water delivered by means of the external pump 72 passes from the radiator 70 through one piece of the external piping 71 to flow into the space S between the outer tube 52 and the inner tube 51 so as to cool the catalyst 53, and then returns to the radiator 70 through the other piece of the external piping 71.

Figure 7:
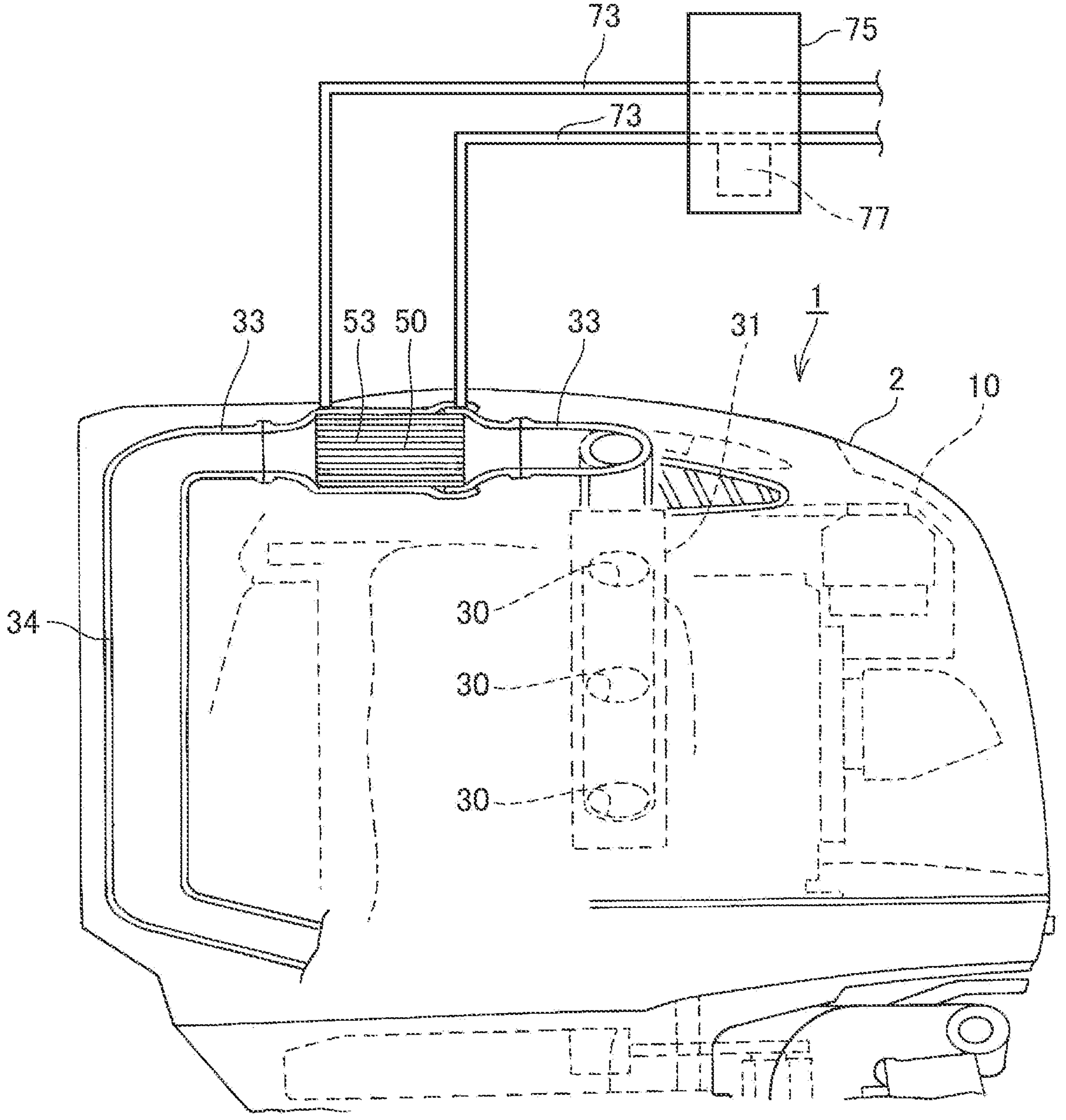
FIG. 7 is a side view illustrating a schematic configuration showing the exhaust structure of the V-type engine according to a modification.

FIG. 7 is a side view illustrating a schematic configuration showing the exhaust structure of the V-type engine 10 according to a modification.

Further, as illustrated in FIG. 7, for example, a catalyst holder 50 may be provided with a cooling unit 75 that is an example of the cooling mechanism that cools and circulates the cooling water via pieces of external piping 73 in pair.

Specifically, the cooling unit 75 is the cooling mechanism including an external pump 77. The cooling unit 75 may be attached to the outer side of the casing 2 of the outboard motor 1. Further, without limiting to this, the cooling unit 75 may be attached to a ship to which the outboard motor 1 is attached.

The pieces of external piping 73 in pair are each connected, at one end, to the catalyst holder 50, with the other end disposed in the water. The water referred to herein is river, lake and marsh, sea, or the like where the ship in which the outboard motor 1 is provided is disposed.

The external pump 77 corresponds to an example of the cooling water supply device and circulates cooling water between the catalyst holder 50 and the water.

The cooling water delivered by means of the external pump 77 passes from the water through one piece of the external piping 73 to flow into the space S between the outer tube 52 and the inner tube 51 so as to cool the catalyst 53, and then returns to the cooling unit 75 through the other piece of the external piping 73.

As illustrated in FIG. 6 and FIG. 7, in the outboard motor 1, with the cooling mechanism that can be arranged outside the outboard motor 1, it is possible to more surely adjust the temperature of the catalyst while restricting a layout change inside the outboard motor 1.

Figure 8:
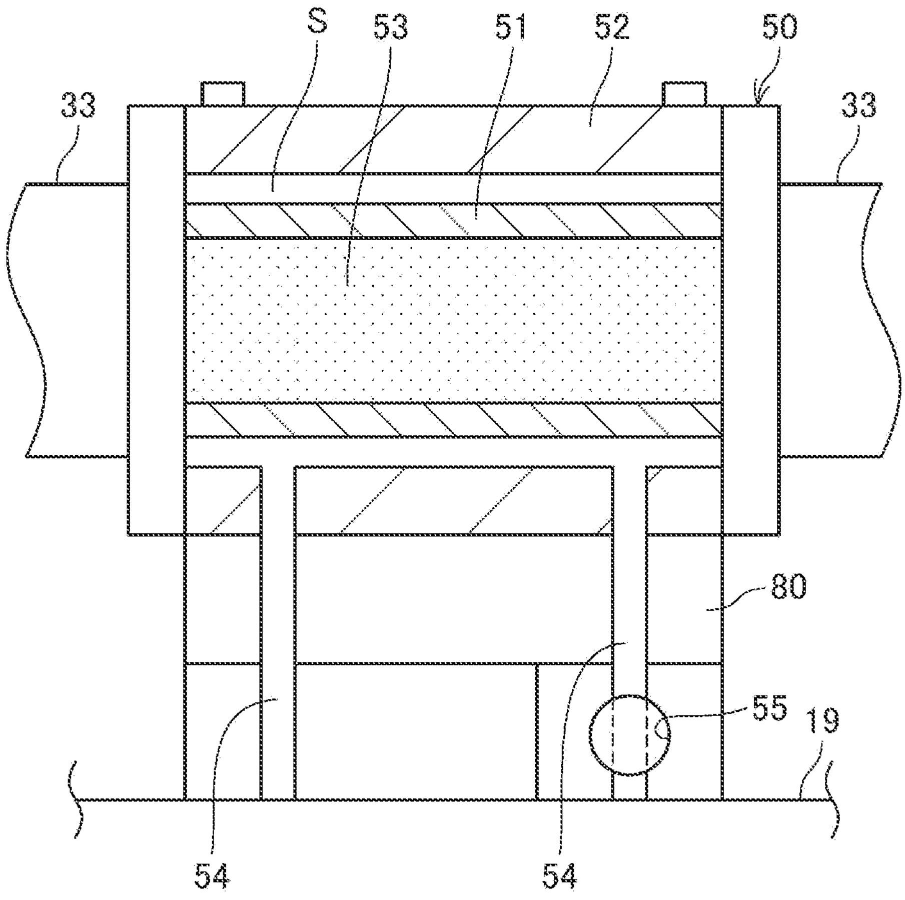
FIG. 8 is a longitudinal cross-sectional view illustrating a schematic configuration showing the catalyst holder according to a modification.

FIG. 8 is a longitudinal cross-sectional view illustrating a schematic configuration showing the catalyst holder according to a modification.

In the aforementioned embodiment, the catalyst holders 50 are directly attached to the cylinder head 20. However, without limiting to this, in accordance with the layout inside the casing 2 of the outboard motor 1, the catalyst holders 50 may be attached to the cylinder head 20, the intake system parts, or the like via an attaching jig 80 as illustrated in FIG. 8.

In this manner, even in a case where the catalyst holder 50 cannot be directly attached due to the layout inside the casing 2, the catalyst holder 50 can be attached to a predetermined site of the outboard motor 1 via the attaching jig 80. Alternatively, in the outboard motor 1, it is also possible to secure a space for various pieces of piping or cables by attaching the catalyst holder 50 to a predetermined site of the outboard motor 1 via the attaching jig 80 depending on the layout inside the casing 2.

Further, the heat release may be restricted by, for example, covering the catalyst holder 50, the coupling exhaust pipe 32, the merging exhaust pipe 33, the lower exhaust pipe 34, and the like with metal or a fiber-reinforced resin. In this manner, it is possible to control the temperature of the parts of the V-type engine 10 to a certain temperature or lower, control an intake temperature to a certain temperature or lower, and improve the durability of the V-type engine 10.

Further, the present invention does not limit the finished equipment as long as it is the V-type engine in which the crankshaft is disposed vertically, and is applicable to, for example, a riding lawn mower, a grass mower, a riding snow blower, or an outdoor motor.

[Configurations Supported by the Aforementioned Embodiment]

The aforementioned embodiment supports the following configurations.

(Configuration 1) A V-type engine in which a crankshaft is disposed vertically, the V-type engine including: a plurality of banks; exhaust openings respectively provided in the plurality of banks; exhaust pipes communicating with the exhaust openings and extending from the respective banks; and a catalyst holder that holds a catalyst in a merge portion where the exhaust pipes are merged in a site located on an upper side of the banks.

According to this configuration, exposure of the catalyst holder to water is restricted, so that a further higher effect of a waterproof measure in the catalyst holder can be produced.

(Configuration 2) The V-type engine according to Configuration 1, wherein the exhaust pipes communicating with the exhaust openings in the respective banks of the cylinder head extend from the exhaust openings toward the upper side of the banks, then extend toward the catalyst holder, are merged on one end side of the catalyst holder, and are connected to one end of the catalyst holder.

According to this configuration, the exhaust gas from each bank is aggregated to be guided into one catalyst holder.

(Configuration 3) The V-type engine according to Configuration 1, including a casing, wherein the exhaust pipe on a downstream side of the catalyst holder extends along an outer side of the cylinder head and is then connected to an exhaust passage provided in the casing.

According to this configuration, the exhaust gas passing the catalyst via the exhaust pipe can be discharged to the outside via the exhaust passage.

(Configuration 4) The V-type engine according to Configuration 1, wherein the catalyst holder is directly attached to the cylinder head.

According to this configuration, the catalyst holder can be easily installed in the cylinder head.

(Configuration 5) The V-type engine according to Configuration 1, wherein the catalyst holder is attached to the cylinder head via an attaching jig.

According to this configuration, even in a case where the catalyst holder cannot be directly attached due to the layout inside the casing 2, the catalyst holder can be easily installed in the cylinder head using the attaching jig. Further, according to this configuration, in the V-type engine, the catalyst holder is attached to the cylinder head using the attaching jig, so that a space for installing various pieces of piping or cables can be secured.

(Configuration 6) The V-type engine according to Configuration 1, wherein the catalyst holder includes a cooling mechanism.

According to this configuration, the catalyst holder includes the cooling mechanism, so that the temperature of the catalyst holder can be adjusted to a moderate temperature. Therefore, by maintaining the catalyst at a predetermined temperature, oxidation and reduction reaction of the catalyst can be favorably performed.

(Configuration 7) The V-type engine according to Configuration 6, wherein the cooling mechanism includes: cooling water piping for delivering, to the catalyst holder, part of cooling water to be delivered to the cylinder head; and a cooling water supply device for delivering, to the catalyst holder, cooling water via the cooling water piping.

According to this configuration, even when the speed of the V-type engine is not sufficiently increased, the catalyst holder 50 can be cooled.

(Configuration 8) The V-type engine according to Configuration 7, wherein the cooling water supply device operates as a catalyst temperature adjuster upon start-up of an engine.

According to this configuration, in a case where the cooling capacity of the V-type engine is insufficient, when operating as a catalyst temperature adjuster upon start-up of the V-type engine, the cooling water supply device can contribute to exhibiting the capacity of the catalyst and the durability.

(Configuration 9) The V-type engine according to Configuration 6, wherein the cooling mechanism separately retains a cooling unit and cools the catalyst holder.

According to this configuration, for the cooling mechanism, it is preferable to provide a cooling unit with a radiator, for example, which can more properly control the temperature adjustment of the catalyst to thus contribute to exhibiting the capacity of the catalyst and the durability.

(Configuration 10) The V-type engine according to Configuration 6, wherein the cooling mechanism separately supplies cooling water from water to the catalyst holder and releases the cooling water into the water from the catalyst holder.

According to this configuration, the cooling mechanism only needs to have a structure for supply and release of cooling water that separately supplies cooling water from water to the catalyst holder and releases the cooling water into the water from the catalyst holder, and exhibits sufficient effects only with the addition of simple equipment.

(Configuration 11) An outboard motor, including the V-type engine according to Configuration 1.

According to this configuration, exposure of the catalyst holder to water is restricted, so that an outboard motor in which a further higher effect of a waterproof measure in the catalyst holder is produced can be obtained.

(Configuration 12) A ship, including the outboard motor according to Configuration 11.

According to this configuration, exposure of the catalyst holder to water is restricted, so that a ship in which a further higher effect of a waterproof measure in the catalyst holder is produced can be obtained.

REFERENCE SIGNS LIST

1 outboard motor
2 casing
10 V-type engine
19 bank
20 cylinder head
30 exhaust opening
31 upper exhaust pipe (exhaust pipe)
32 coupling exhaust pipe (exhaust pipe)
33 merging exhaust pipe (exhaust pipe)
34 lower exhaust pipe (exhaust pipe)
50 catalyst holder
51 inner tube
52 outer tube
53 catalyst
54 cooling water piping
55 secondary piping
56 water pump
70 radiator (cooling unit)
71 external piping
72 external pump
73 external piping
75 cooling unit
77 external pump
80 attaching jig
S space

The invention claimed is:

1. A V-type engine in which cylinders where pistons operate are arranged in a V-shape and a crankshaft driven by driving of the pistons is disposed vertically, the V-type engine comprising:

exhaust pipes communicating with exhaust openings in respective banks of a cylinder head; and a catalyst holder that holds a catalyst in a merge portion where the exhaust pipes are merged in a site located on an upper side of the banks, wherein the catalyst holder includes an inner tube and an outer tube, the inner tube is attached to the cylinder head and the catalyst is housed on an inner side of the inner tube, the outer tube is disposed on an outer side of the inner tube, the V-type engine further comprises a first cooling water piping and a second cooling water piping each of which communicates with a space between the inner tube and the outer tube and each of which communicates with a cooling water channel provided inside the cylinder head, each of the first cooling water piping and the second cooling water piping deliver part of cooling water to be delivered to the cylinder head to the catalyst holder, and one end of a secondary piping is connected to the first cooling water piping and an other end of the secondary piping is provided with a water pump that delivers cooling water at start-up of the engine.

2. The V-type engine according to claim 1, wherein the exhaust pipes communicating with the exhaust openings in the respective banks of the cylinder head extend from the exhaust openings toward the upper side of the banks, then extend toward the catalyst holder, are merged on one end side of the catalyst holder, and are connected to one end of the catalyst holder.

3. The V-type engine according to claim 1, comprising a casing, wherein the exhaust pipe on a downstream side of the catalyst holder extends along an outer side of the cylinder head and is then connected to an exhaust passage provided in the casing.

4. The V-type engine according to claim 1, wherein the catalyst holder is directly attached to the cylinder head.

5. The V-type engine according to claim 1, wherein the catalyst holder is attached to the cylinder head via an attaching jig.

6. An outboard motor, comprising the V-type engine according to claim 1.

7. A ship, comprising the outboard motor according to claim 6.

* * * * *